United States Patent

Ishino et al.

[11] Patent Number: 5,910,277
[45] Date of Patent: Jun. 8, 1999

[54] PROCESS OF MAKING A POROUS PTFE MEMBRANE

[75] Inventors: Toshiaki Ishino; Norikane Nabata; Takuya Maeoka, all of Osaka, Japan

[73] Assignee: Nitto Denko Corporation, Osaka, Japan

[21] Appl. No.: 08/857,678

[22] Filed: May 16, 1997

[30] Foreign Application Priority Data

May 17, 1996 [JP] Japan ..................................... 8-123755
Aug. 2, 1996 [JP] Japan ..................................... 8-205088

[51] Int. Cl.$^6$ .................................................... B29C 67/20
[52] U.S. Cl. ........................... 264/127; 264/154; 264/232; 264/235.8; 264/288.8; 264/290.2
[58] Field of Search ............................. 264/41, 127, 154, 264/232, 235.8, 288.8, 290.2

[56] References Cited

U.S. PATENT DOCUMENTS

| | | | |
|---|---|---|---|
| 3,953,566 | 4/1976 | Gore | 264/154 X |
| 4,596,837 | 6/1986 | Yamamoto et al. | 521/145 |
| 4,902,423 | 2/1990 | Bacino . | |

FOREIGN PATENT DOCUMENTS

| | | |
|---|---|---|
| 87149 | 8/1983 | European Pat. Off. . |
| 418155 | 3/1991 | European Pat. Off. . |
| 633053 | 1/1995 | European Pat. Off. . |
| 59-152825 | 8/1984 | Japan . |
| 3-221541 | 9/1991 | Japan . |
| 5-202217 | 8/1993 | Japan . |
| 7-196831 | 8/1995 | Japan . |
| 2025835 | 1/1980 | United Kingdom . |
| WO94/16802 | 8/1994 | WIPO . |
| 96-04063 | 2/1996 | WIPO . |

OTHER PUBLICATIONS

Abstract of Japan 7–196,831 (Published Aug. 1, 1995).

*Primary Examiner*—Leo B. Tentoni
*Attorney, Agent, or Firm*—Sughrue, Mion, Zinn, Macpeak & Seas, PLLC

[57] ABSTRACT

A fine powder of polytetrafluoroethylene is mixed with a liquid lubricant, and the mixture is molded into an unsintered sheet by at least one of an extrusion method and a rolling method. The liquid lubricant is removed from the sheet by at least one of a heating method and an extrusion method. This sheet-form molding is stretched in the machine direction to produce a sheet-form polytetrafluoroethylene molding which, upon analysis with a differential scanning calorimeter, gives a crystal fusion curve having an endothermic peak in the temperature range of 345±5 ° C. and which has a degree of crystallization of from 0.1 to 0.85 and a specific gravity of 1.4 or lower. The molding is then stretched in the transverse direction to produce a porous polytetrafluoroethylene (PTFE) membrane. The process is effective in producing, with good reproducibility, a useful porous PTFE membrane which has a high collection efficiency and a low pressure loss and is reduced in the leakage of coarse particles.

7 Claims, 1 Drawing Sheet

PROCESS OF MAKING A POROUS PTFE MEMBRANE

FIELD OF THE INVENTION

The present invention relates to a process for producing a porous polytetrafluoroethylene membrane, a sheet-form polytetrafluoroethylene molding from which the porous membrane is produced, a porous polytetrafluoroethylene (hereinafter referred to as "PTFE") membrane, and an air filter medium.

BACKGROUND OF THE INVENTION

Air filter media produced by adding a binder to glass fibers and forming the mixture into a sheet have hitherto been used frequently for clean rooms. However, such filter media has some problems. For example, self-dusting is caused by the presence of adherent fiber debris in the filter media or by bending during processing, or if the amount of a binder is he increased to prevent self-dusting, an increase in pressure loss results (see JP-A-63-16019; the term "JP-A" as used herein means an "unexamined published Japanese patent application"). Furthermore, there has been another problem that if this filter media comes in contact with a kind of chemicals such as hydrofluoric acid, the glass and binder are deteriorated to thereby cause dusting.

An electric filter medium made of synthetic fibers has been proposed in order to eliminate these problems (see JP-A-54-53365), but such a filter medium has a problem of electric attenuation.

PTFE is a clean material with chemical resistance. Porous PTFE membranes have hence come to be used recently as filter media in various fields. In particular, an extremely thin porous PTFE membrane having substantially no large knots and consisting only of fibers is useful as an air filter medium for use in the fields where a high-degree of clean atmosphere is required, such as, e.g., the production of semiconductors.

Such useful porous PTFE membranes can be produced, for example, by forming a semi-sintered PTFE sheet (see JP-A-59-152825 which corresponds to U.S. Pat. No. 4,596,837) and then biaxially stretching the sheet to render it porous (see JP-A-3-221541 or JP-A-5-202217). However, this prior art process has a difficulty in fixing such conditions that the "semi-sintered state", which is suitable for the subsequent stretching, is realized. Especially because the range of the temperature condition is extremely narrow, it has been considerably difficult to industrially realize the desired semi-sintered state. For this reason, the above-described useful porous PTFE membrane could not be produced efficiently. The use of a porous PTFE membrane obtained by stretching a sheet-form unsintered PTFE molding as a high-performance air filter medium is frequently proposed, for example, in International Publication Wo 94/16802 and JP-A-7-196831.

The porous PTFE membranes proposed in International Publication WO 94/16802 and JP-A-7-196831 each has an extremely small pore diameter (average pore diameter) of 0.5 µm or smaller so as to attain a heightened collection efficiency and has an extremely small thickness so as to retain a low pressure loss. However, the prior art PTFE membranes have the following problems because of the structure having a reduced pore diameter and a highly reduced thickness as described above. One problem is that a sufficiently high cleanliness cannot be provided, since the porous membranes have large fluctuations in thickness and pore diameter based on the respective average values thereof and hence cause leakage attributable to parts thereof having an extremely low pressure loss and to pinholes, that is, particles not smaller than those having a particle size to be filtered off pass through the membranes. Another problem is that since the fluctuations in thickness and pore diameter results in fluctuations in pressure loss, a filter unit employing the PTFE membrane exhibits a wide distribution of air flow rate and cannot exhibit a laminar air flow.

On the other hand, it is known that collection efficiency and pressure loss, which are the most important properties of filter media, are generally inconsistent with each other. Namely, increasing the efficiency of collection results in increased pressure losses. As a measure of a balance between collection efficiency and pressure loss, PF (performance of filter) value is frequently used. This PF value is defined by the following Equation (1); the higher the PF value of a filter medium, the higher the efficiency of dust collection of the filter medium and the lower the pressure loss thereof.

Equation 1

$$\text{PF Value} = \{-\log(\text{Permeability}/100)/(\text{Pressure loss})\} \times 100$$

The permeability in Equation (1) is obtained using the relationship: (Permeability)=[100−(Collection Efficiency)].

Few reports have been made on the PF values of porous PTFE membranes. The PF values of porous PTFE membranes described in Examples given in WO 94/16802, cited hereinabove, were determined from the collection efficiencies and pressure losses thereof, and were found to be up to about 21 at the most.

SUMMARY OF THE INVENTION

The present invention has been achieved under the circumstances described above. The first object of the present invention is to provide a process for producing a porous PTFE membrane which effectively produces a porous PTFE membrane having a high collection efficiency and a low pressure loss with good reproducibility, and to provide a sheet-form PTFE molding which can be used in the process of producing the porous membrane.

The second object of the present invention is to provide a porous PTFE membrane having a high collection efficiency and an extremely low pressure loss and having reduced fluctuations in pressure loss, and to provide a process for producing the same.

The third object of the present invention is to provide an air filter medium which has an exceedingly high collection efficiency and an exceedingly low pressure loss, is significantly reduced in fluctuations in pressure loss, is free from the leakage of coarse particles, and has excellent mechanical strength and a long life.

In order to accomplish the first object described above, the first process of the present invention for producing a porous PTFE membrane comprises:

mixing a fine PTFE powder with a liquid lubricant;
    molding the mixture into an unsintered sheet by at least one of the extrusion method and the rolling method;
  stretching the sheet-form molding in the machine direction (lengthwise direction) at a temperature lower than the melting point of sintered PTFE to obtain a sheet-form PTFE molding which, upon analysis with a differential scanning calorimeter, gives a crystal fusion curve having an endothermic peak in the temperature range of 345±5° C. and which has a degree of crystallization of from 0.1 to 0.85 and a specific gravity of 1.4 or lower; and then stretching the sheet-form PTFE molding in the transverse direction (widthwise direction).

Fibrillation is effectively accelerated without causing pore enlargement throughout the whole sheet-form PTFE molding according to the constitution of the present invention, i.e., the process which comprises stretching in the transverse direction a sheet-form PTFE molding which has been obtained by stretching an unsintered sheet-form PTFE molding in the machine direction and has such specific properties that it upon analysis with a differential scanning calorimeter gives a crystal fusion curve having an endothermic peak in the temperature range of 345±5° C., a degree of crystallization of from 0.1 to 0.85, and a specific gravity of 1.4 or lower. As a result, a porous PTFE membrane having a high collection efficiency and a low pressure loss can be produced with good reproducibility.

In the first process of the present invention for producing a porous PTFE membrane, the stretching of the unsintered sheet-form molding in the machine direction is preferably conducted at a temperature of from 150 to less than 327° C. and in a stretching ratio (draw ratio) of from 2 to 60. Due to this constitution, a sheet-form PTFE molding having effectively accelerated fibrillation and the specific properties can be formed.

In order to accomplish the second object described above, the second process of the present invention for producing a porous PTFE membrane is the above-described first process of the invention for producing a porous PTFE membrane wherein the stretching of the unsintered sheet-form molding in the machine direction is conducted in a stretching ratio of from 10 to 60, and the stretching of the sheet-form PTFE molding in the transverse direction is conducted in an area stretching ratio of 450 or higher. The term "area stretching ratio" as used herein is defined as the product of the stretching ratio in stretching the sheet-form PTFE molding in the transverse direction and the stretching ratio (10 to 60) in stretching the sheet-form PTFE molding in the machine direction. Due to this constitution, fibrillation is evenly and effectively accelerated throughout the whole sheet-form PTFE molding. As a result, a porous PTFE membrane having a high collection efficiency and an exceedingly low pressure loss (below 20 mmH$_2$O), that is, a high PF value (22 or higher), and exhibiting reduced fluctuations in pressure loss can be produced with good reproducibility.

In the first and second processes of the present invention for producing a porous PTFE membrane, the sheet-form PTFE molding is preferably heat-treated after being stretched in the transverse direction. This heat treatment is effective in improving the strength and dimensional stability of the porous PTFE membrane.

It is also preferred, in the first and second processes of the present invention for producing a porous PTFE membrane, that the stretching of the sheet-form PTFE molding in the transverse direction be conducted at a temperature of from 40 to 100° C. Due to this constitution, pore enlargement can be prevented.

The sheet-form PTFE molding of the present invention gives, upon analysis with a differential scanning calorimeter, a crystal fusion curve having an endothermic peak in the temperature range of 345±5° C., and has a degree of crystallization of from 0.1 to 0.85 and a specific gravity of 1.4 or lower. The sheet-form PTFE molding of the present invention, having such constitution, is an intermediate used in the above-described process of the present invention for producing a porous PTFE membrane and has a moderate crystallinity and a moderate porosity. Merely stretching this sheet-form PTFE molding in the transverse direction easily gives a porous PTFE membrane having a high collection efficiency and a low pressure loss.

The porous PTFE membrane of the present invention is characterized in that it has a pressure loss lower than 20 mmH$_2$O and a PF value of 22 or higher. Due to this constitution, a filter medium exhibiting an exceedingly high dust-removing performance at a low operation cost can be obtained.

In order to accomplish the third object described above, the air filter medium of the present invention comprises at least two stacked layers each consisting of the above-described porous PTFE membrane having a pressure loss lower than 20 mmH$_2$O and a PF value of 22 or higher. Due to this constitution, the filter medium of the present invention not only has smaller fluctuations in pressure loss and collection efficiency than an air filter medium constituted of only one layer of the porous PTFE membrane, but also is completely free from the leakage of coarse particles and has improved mechanical strength and a prolonged life.

The air filter medium of the present invention preferably contains a reinforcing material interposed between the stacked porous polytetrafluoroethylene membranes. Due to this constitution, suitability for pleat processing and strength are improved.

In the air filter medium of the present invention, the reinforcing material is preferably a nonwoven fabric, in particular, a nonwoven fabric constituted of composite synthetic fibers having a core/sheath structure in which the cores have a higher melting point than the sheaths. Due to this constitution, the filter medium is less apt to shrink during thermal lamination, and the pitch of pleats in filter element fabrication can be increased.

BRIEF DESCRIPTION OF THE DRAWINGS

In FIGS. 1 and 2, numerals 1 and 11 indicate a porous PTFE membrane, and numerals 2, 3, 12 and 13 indicate a spunbonded nonwoven fabric made of composite fibers having a core/sheath structure.

DETAILED DESCRIPTION OF THE INVENTION

Figure 1:
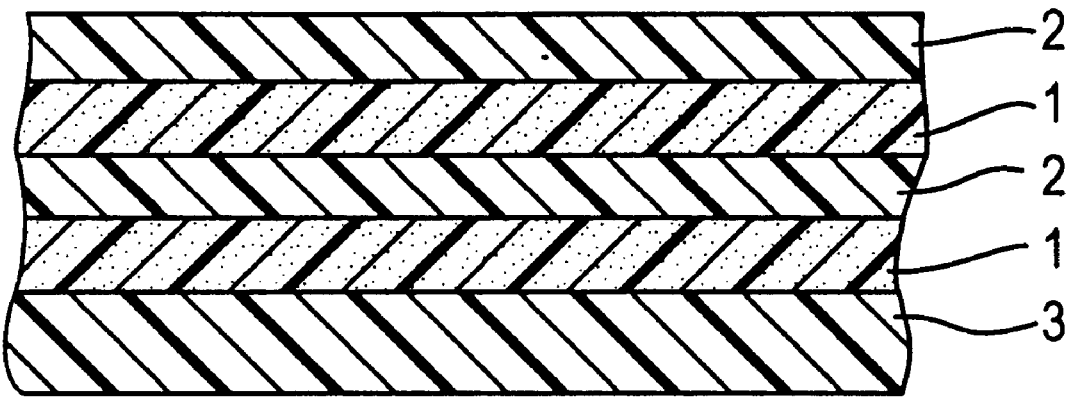
FIG. 1 is a sectional view diagrammatically illustrating the constitution of the air filter medium obtained in Example 5 according to the present invention.

The process for producing a porous PTFE membrane according to the present invention is explained below in detail.

First, a fine powder of PTFE is mixed with a liquid lubricant, and this mixture is molded in an unsintered state by at least either of the extrusion method and the rolling method to obtain a sheet-form molding. The fine PTFE powder is not particularly limited, and commercial ones can be used. The fine PTFE powder having a primary particle diameter of 0.2 to 0.5 μm and a secondary particle diameter of 300 to 600 μm is preferably used. Examples thereof include Polyflon F-104 (manufactured by Daikin Industries, Ltd., Japan), Fluon CD-123 (manufactured by Asahi-ICI Fluoropolymers Co., Ltd.), and Teflon 6J (manufactured by Du Pont-Mitsui Fluorochemicals Co., Ltd., Japan).

The liquid lubricant is not particularly limited, as long as it is capable of wetting the surface of the fine PTFE powder and of being removed by evaporation, extraction, or another technique after the sheet-form molding is obtained. Those having a surface tension of about 30 dyn/cm or less are preferred. Examples thereof include hydrocarbons such as liquid paraffin, naphtha, white oil, toluene, and xylene, alcohols, ketones, esters, and mixtures of two or more thereof.

The amount of the liquid lubricant added to the fine powder of PTFE is appropriately determined according to the kinds of the fine PTFE powder and liquid lubricant and to the molding method to be used for obtaining a sheet-form molding. However, the addition amount thereof is usually about from 5 to 50 parts by weight, preferably from 20 to 40 parts by weight, per 100 parts by weight of the fine PTFE powder.

The fine PTFE powder and liquid lubricant are mixed, and then molded into a sheet form by at least either of the extrusion method and the rolling method. The fine PTFE powder and liquid lubricant can be mixed at ordinary temperature, preferably from 5 to 19° C., and molded into a sheet form preferably at a temperature of from 30 to 80° C. Examples of these molding methods include: a method in which the mixture of a fine PTFE powder and a liquid lubricant is extruded into a rod form and the rod is rolled into a sheet with a pair of rolls; a method in which the mixture is extruded into a plate form to obtain a sheet; and a method in which the mixture is extruded into a plate form and the plate is rolled with rolls to obtain a sheet. The thickness of the sheet-form molding thus obtained is usually from 0.05 to 0.5 mm.

Subsequently, the sheet-form molding is stretched in the machine direction to render it porous. It is generally preferred to remove the liquid lubricant from the sheet-form molding prior to this stretching. This removal of the liquid lubricant is conducted by a heating method or an extraction method or a combination of both.

The stretching of the sheet-form molding in the machine direction is preferably conducted at a high stretching ratio because higher stretching ratios accelerate the fibrillation of the porous membrane. However, the stretching is conducted in a stretching ratio of from 10 to 30 from the standpoint of stretchability. The temperature for this stretching is usually from 150° C. to less than 327° C.

By carrying out the steps described above, a sheet-form PTFE molding is formed which, upon analysis with a differential scanning calorimeter, gives a crystal fusion curve having an endothermic peak in the temperature range of 345±5° C. and which is porous and has a degree of crystallization of from 0.1 to 0.85 and a specific gravity of 1.4 or lower. The porous nature of this sheet-form PTFE molding can be ascertained, for example, by an examination with a scanning electron microscope or by the method shown below using a marker ink. Specifically, a marker ink is first applied to the surface of the sheet-form PTFE molding, and this surface is wiped with a cloth impregnated with a solvent, e.g., toluene. In the case where the ink can be completely removed by the wiping, the molding is nonporous. In the case where the ink partly remains unremoved, the molding is porous. The term "specific gravity" herein means the "apparent specific gravity" which is obtained by dividing the weight by the apparent volume.

The sheet-form PTFE molding described above differs from the conventional semi-sintered PTFE (described in JP-A-59-152825) in the following points. The sheet-form PTFE molding according to the present invention has undergone stretching at a temperature lower than the melting point of the sinter, has a specific gravity of 1.4 or lower, and is porous. Further, this sheet-form PTFE molding is also characterized in that the crystallinity thereof is difficult to determine by X-ray diffractometry. This is because the sheet-form PTFE molding according to the present invention has been highly oriented by the stretching, and this degree of orientation makes it impossible to accurately determine the crystallinity by X-ray diffractometry.

The endothermic peak on a crystal fusion curve obtained with a differential scanning calorimeter (DSC) and the degree of crystallization are defined by the peak temperature and the heat of crystal fusion both measured with a differential scanning calorimeter (DSC), as in JP-A-59-152825.

The endothermic peak and the degree of crystallization are determined in the following ways, which are the same as in JP-A-59-152825.

A sample weighing 10.0±0.1 mg is cut out of a sheet-form PTFE molding. Since the thermal denaturation of PTFE proceeds from the sheet surface to the inside, the sampling is conducted so that the sample has balanced degrees of denaturation in the direction of the sheet thickness. A sample of unsintered PTFE weighing 10.0±0.1 mg is prepared in the same manner. Using these samples, a crystal fusion curve is obtained as follows.

The sample of unsintered PTFE is placed on the aluminum pan of a DSC, and the heat of fusion of the unsintered PTFE and that of sintered PTFE are measured by conducting the following steps (1) to (3).

(1) The sample is heated to 277° C. at a heating rate of 160° C./min, and then heated from 277° C. to 360° C. at a heating rate of 10° C./min.

The temperature at which an endothermic peak appears on the crystal fusion curve recorded in this heating step is defined as the "melting point of the unsintered PTFE" or the "melting point of the fine PTFE powder."

(2) Immediately after the heating to 360° C., the sample is cooled to 277° C. at a cooling rate of 80° C./min.

(3) The sample is reheated to 360° C. at a heating rate of 10° C./min. The temperature at which an endothermic peak appears during this heating step is defined as the "melting point of sintered PTFE."

The heat of fusion of the unsintered PTFE and that of sintered PTFE each is proportional to the area of the region between the endothermic curve and the base line. The base line is the straight line drawn from the 307° C. point on the DSC chart so as to touch the base part at the right end of the endothermic curve.

Subsequently, the crystal fusion curve of the sheet-form PTFE molding is recorded according to step (1) described above.

The degree of crystallization is calculated using the following Equation (2).

Equation (2)

$$\text{Degree of Crystallization} = (S_1 - S_3)/(S_1 - S_2)$$

In Equation (2), $S_1$ is the area of the endothermic curve of the unsintered PTFE, $S_2$ is the area of the endothermic curve of sintered PTFE, and $S_3$ is the area of the endothermic curve of the sheet-form PTFE molding according to the present invention.

By stretching the sheet-form PTFE molding, which has an appropriate degree of crystallization and an appropriate porosity, in the transverse direction, fibrillation can be effectively attained without causing pore enlargement (without enhancing fluctuations in pore diameter) throughout the whole PTFE molding.

The temperature for the stretching of the sheet-form PTFE molding in the transverse direction is preferably from 40 to 100° C. The stretching ratio is usually from 20 to 100, but it is preferred to regulate the area stretching ratio, which is defined as the product of the stretching ratio in the transverse-direction stretching and the stretching ratio in the machine-direction stretching as described above, to 450 or higher. The higher the area stretching ratio, the more the fibrillation is accelerated and the higher the PF value which the obtained porous membrane has. The porous membrane obtained through transverse-direction stretching has such excellent properties that the pressure loss thereof is 50 mmH$_2$O or lower and the collection efficiency thereof is 99.9% or higher. In particular, in the case where the area stretching ratio is adjusted to 450 or higher, the obtained porous membrane has extremely excellent performance, namely, it exhibits a pressure loss as low as below 20 mmH$_2$O, without causing a considerable decrease in collection efficiency, and has a PF value of 22 or higher. Further, the porous membrane has reduced fluctuations in pressure loss. As a result, a porous PTFE membrane exhibiting an extremely excellent dust-removing performance at a low operation cost can be obtained.

The porous PTFE membrane thus obtained may be subjected to a heat treatment (sintering treatment) in order to enhance strength and dimensional stability. This heat treatment is conducted usually at a temperature not lower than the melting point of sintered PTFE while fixing the dimensions thereof, preferably at a temperature of 350 to 400° C. and for 10 seconds to 3 minutes. It should however be noted that such a heat treatment may leads to a decrease in pressure loss. In the case where the porous membrane obtained through the transverse-direction stretching described above has a PF value of 22 or higher and a pressure loss of 20 mmH$_2$O or higher, this heat treatment according to the present invention can lower the pressure loss to below 20 mmH$_2$O.

The air filter medium is explained next.

The air filter medium of the present invention comprises at least two stacked layers each consisting of the porous PTFE membrane obtained by the method described above and having a pressure loss lower than 20 mmH$_2$O and a PF value of 22 or higher. This air filter medium not only has even smaller fluctuations in pressure loss and collection efficiency than an air filter medium constituted of only one layer of the porous PTFE membrane having a pressure loss lower than 20 mmH$_2$O and a PF value of 22 or higher, but also has a leak-less structure with no penetrating pinholes. This air filter medium is suitable for use as an HEPA (high-efficiency particulate air) filter or a ULPA (ultra-low-permeation air) filter for clean rooms, etc.

Methods for stacking two or more layers of the porous PTFE membrane in fabricating the air filter medium of the present invention are not particularly limited. Examples thereof include a technique of using an adhesive and a technique of thermal lamination through a thermoplastic porous material (a nonwoven fabric, net, etc.). In general, porous PTFE membranes are laminated to each other through a porous material (a nonwoven fabric, net, etc.) as a reinforcing material interposed therebetween, because a filter medium comprising porous PTFE membranes and containing no such reinforcing material has poor suitability for pleat processing and insufficient strength.

Examples of the reinforcing material (porous material) include nonwoven fabrics, woven fabrics, meshes, and other porous films. Examples of the material of such reinforcing materials include polyolefins (e.g., polyethylene and polypropylene), nylons, polyesters, aramids (aromatic polyamides), composites of these materials (e.g., nonwoven fabrics made of fibers of a core/sheath structure, and two-layer nonwoven fabrics made of a low-melting material and a high-melting material), and porous fluoropolymer films (e.g., porous films of PFA (tetrafluoroethylene/perfluoroalkyl vinyl ether copolymer), PEP (tetrafluoroethylene/hexafluoropropylene copolymer), and PTFE). Especially preferred are nonwoven fabrics constituted of composite synthetic fibers having a core/sheath structure in which the cores have a higher melting point than the sheaths, and two-layer nonwoven fabrics made of a low-melting material and a high-melting material. The nonwoven fabrics constituted of composite fibers of a core/sheath structure and the two-layer nonwoven fabrics made of a low-melting material and a high-melting material do not shrink during lamination, and the membranes laminated using these nonwoven fabrics are easily fabricated into HEPA filters or ULPA filters and can attain an increased pitch of pleats in filter element fabrication.

The present invention will be explained below in detail by reference to Examples, but the invention should not be construed as being limited to these Examples. The measurements of pressure loss, collection efficiency, leak-proof performance, and PF value in the Examples were conducted at ordinary temperature according to the following methods, while analyses for endothermic curve, degree of crystallization, and specific gravity and for ascertaining porosity on the surface were conducted according to the methods described above.

Pressure Loss

A sample (porous PTFE membrane; filter medium) was attached to a circular holder having an effective area of 100 cm$^2$. A pressure difference between the inlet and the outlet sides was imposed on the sample, and the velocity of flow through the sample was adjusted to 5.3 cm/sec with a flowmeter. The pressure loss was measured in this state with a pressure gauge (manometer). This measurement was made with respect to fifty sites for each sample. The average of the thus-obtained fifty values was taken as the pressure loss of the filter medium, and the fluctuations are shown in terms of the maximum and the minimum values thereof.

Collection Efficiency

Using the same apparatus as for the measurement of pressure loss, a sample (porous PTFE membrane; filter medium) was adjusted so as to have a velocity of flow therethrough of 5.3 cm/sec, and polydisperse dioctyl phthalate (DOP) was allowed to flow from the upstream side in such a manner that the concentration of particles of 0.1 μm to 0.15 μm was about 10$^7$ particles per liter. The concentration of particles at the downstream side was measured with a particle counter, and the collection efficiency (%) was determined using the following Equation (3).

Equation 3

$$\text{Collection Efficiency} = \left\{ 1 - \frac{(\text{concentration at the downstream side})}{(\text{concentration at the upperstream side})} \right\} \times 100\%$$

The particles used for the evaluation had sizes of from 0.1 to 0.15 μm. The fluctuations are shown in terms of the maximum and the minimum values.

Leak-Proof Performance

Leak-proof performance is evaluated in terms of the number of samples for which particles of 0.3 μm or larger were detected on the downstream side in the measurement of collection efficiency.

PF Value

PF value was calculated from the collection efficiency and the pressure loss using Equation (1) given hereinabove.

EXAMPLE 1

A hundred parts by weight of a fine PTFE powder (Fluon CD-123, manufactured by Asahi-ICI Fluoropolymers Co., Ltd.) was sufficiently mixed with 30 parts by weight of a liquid lubricant (liquid paraffin). The resulting homogeneous mixture was preformed under the conditions of 20 kg/cm$^2$, subsequently extrusion-molded into a rod form, and then passed through a pair of metal rolls to obtain a continuous film (sheet-form molding) having a thickness of 0.2 mm. The liquid lubricant was removed from the sheet-form molding by extraction with Trichlene, and then the resulting sheet-form molding was wound on a tubular core.

The thus-obtained sheet-form molding was uniaxially stretched in the machine direction by roll stretching at various temperatures in various stretching ratios. Thus, six sheet-form PTFE moldings (Nos. 1 to 6) shown in Table 1 were produced. In the table are also shown the endothermic peak (° C.) and the degree of crystallization of each sample both determined with a DSC.

TABLE 1

| No. | Stretching Temperature (° C.) | Stretching Ratio | Endothermic Peak (° C.) | Degree of Crystallization | Specific Gravity |
|---|---|---|---|---|---|
| 1 | 150 | 20 | 344 | 0.30 | 0.47 |
| 2 | 200 | 20 | 344 | 0.35 | 0.48 |
| 3 | 320 | 15 | 345 | 0.25 | 0.62 |
| 4 | 320 | 20 | 344 | 0.43 | 0.50 |
| 5 | 320 | 30 | 345 | 0.44 | 0.34 |
| 6 | 325 | 20 | 341 | 0.81 | 0.51 |

Subsequently, the sheet-form PTFE molding of No. 4 (porous surface; specific gravity, 0.50) was stretched with a tenter in the transverse direction in a stretching ratio of 20 at different (three) temperatures to produce the three porous PTFE membranes shown in Table 2. These porous PTFE membranes were examined for pressure loss, collection efficiency, and leak-proof performance. The results obtained are shown in Table 2. In the table are also show the stretching temperatures. The pressure loss and the collection efficiency of each sample are shown in terms of the maximum and the minimum values thereof.

TABLE 2

| No. | Stretching Temperature (° C.) | Pressure Loss (mmH$_2$O) | Collection Efficiency (%) |
|---|---|---|---|
| 7 | 50 | 34–44 | 99.9991–99.99991 |
| 8 | 90 | 32–43 | 99.9994–99.99992 |
| 9 | 150 | 27–50 | 99.994–99.99993 |

Tables 2 shows that all the porous PTFE membranes of Nos. 7 to 9, obtained from the sheet-form PTFE molding of No. 4 having the specific properties according to the present invention, had low pressure losses and high collection efficiencies. The above results indicate that high-performance porous PTFE membranes can be industrially and easily produced according to the process of the present invention.

EXAMPLE 2

The porous PTFE membrane of No. 8 in Table 2 was heated at 345° C. for 15 seconds while fixing the dimensions thereof, thereby obtaining the intended porous PTFE membrane. This membrane was examined for pressure loss and collection efficiency in the same manner as in Example 1. The results obtained are shown in Table 3.

TABLE 3

| No. | Pressure Loss (mmH$_2$O) | Collection Efficiency (%) |
|---|---|---|
| 10 | 28–38 | 99.997–99.9998 |

The porous PTFE membrane subjected to heat treatment had improved strength and improved dimensional stability.

EXAMPLE 3

Moldings shown in Table 1 (Nos. 1, 2, 3, 5, and 6) were stretched with a tenter at 90° C. in the transverse direction in a stretching ratio of 20 to produce five porous PTFE membranes. These porous PTFE membranes were examined for pressure loss and collection efficiency. The results obtained are shown in Table 4.

TABLE 4

| No. | Molding No. in Table 1 | Pressure Loss (mmH$_2$O) | Collection Efficiency (%) |
|---|---|---|---|
| 11 | 1 | 32–44 | 99.999–99.99992 |
| 12 | 2 | 31–41 | 99.9994–99.99992 |
| 13 | 3 | 35–46 | 99.9992–99.99998 |
| 14 | 5 | 22–30 | 99.998–99.9997 |
| 15 | 6 | 30–39 | 99.999–99.9999 |

The results given in Table 4 show that the five porous PTFE membranes each had high collection efficiency and low pressure loss which was within a range suitable for practical use.

EXAMPLE 4

Sheet-form PTFE moldings of Nos. 1 to 6 (porous surface; specific gravity, 0.50) were stretched with a tenter at 90° C. in the transverse direction in a stretching ratio of 60 (area stretching ratios, 900 and 1,200) to produce porous PTFE membranes of Nos. 16 to 21. These porous PTFE membranes were examined for pressure loss and collection efficiency. The results obtained are shown in Table 5. In the table, each pressure loss is the average value and each collection efficiency is the minimum value, from which values the PF value was calculated.

TABLE 5

| No. | Molding No. in Table 1 | Pressure Loss (mmH$_2$O) | Collection Efficiency (%) | PF Value |
|---|---|---|---|---|
| 16 | 1 | 18 | 99.999 | 27.7 |
| 17 | 2 | 16 | 99.997 | 28.3 |
| 18 | 3 | 19 | 99.994 | 22.2 |
| 19 | 4 | 15 | 99.99 | 26.6 |
| 20 | 5 | 11 | 99.95 | 30.0 |
| 21 | 6 | 11 | 99.90 | 27.0 |

Table 5 shows that all the porous PTFE membranes of Nos. 6 to 21, produced through stretching so as to result in higher area stretching ratios (900 to 1,200) than those in Example 1 (300 to 400), each had extremely low pressure loss and high collection efficiency and a PF value of 22.2 or higher. Namely, the porous membranes of Nos. 16 to 21 each had an excellent balance between pressure loss and collection efficiency. In this connection, the porous PTFE membranes of Nos. 7 to 9 in Example 1 had a PF value of 16 at efficiency, and leak-proof performance. The results obtained are shown in Table 7, in which the PF values are also shown. Each PF value was calculated from the minimum value of collection efficiency and the average value of pressure loss.

TABLE 7

|  | Pressure Loss (mmH$_2$O) | Fluctuations in Pressure Loss (mmH$_2$O) | Collection Efficiency (%) | Fluctuations in Collection Efficiency (%) | Leak-proof Performance | PF Value |
|---|---|---|---|---|---|---|
| Example 5 | 33 | 31–35 | 99.99999 | 99.99997 to 99.999999 or above | 0 | 19.8 |
| Comparative Example 1 | 36 | 26–45 | 99.99996 | 99.997– 99.99999 | 4 | 12.6 | the most. Further, the membranes of Nos. 16 to 21 showed smaller fluctuations in pressure loss than the porous PTFE membranes of Nos. 7 to 9 in Example 1.

EXAMPLE 5

The porous membrane of No. 19 as indicated in Table 5 and spunbonded nonwoven fabrics made of composite fibers composed of polyester/polyethylene having a core/sheath structure (trade name "Eleves," manufactured by Unichika, Ltd., Japan) were subjected to heat lamination to prepare an air filter medium as shown in FIG. 1. In FIG. 1, numeral 1 denotes the porous PTFE membrane of No. 19, numeral 2 denotes the spunbonded nonwoven fabrics having a basis weight of 15 g/m$^2$, and numeral 3 denotes the spunbonded nonwoven fabric having a basis weight of 70 g/m$^2$.

Properties of the air filter medium obtained are shown in Table 7 given later.

COMPARATIVE EXAMPLE 1

A porous membrane (transverse-direction stretching ratio, 40) was produced according to Example of International Publication WO 94/16802. The pressure loss, collection efficiency, and PF value of this porous membrane are shown in Table 6.

TABLE 6

| Pressure Loss (mmH$_2$O) | Collection Efficiency (%) | PF Value |
|---|---|---|
| 34 | 99.99994 | 18.2 |

Figure 2:
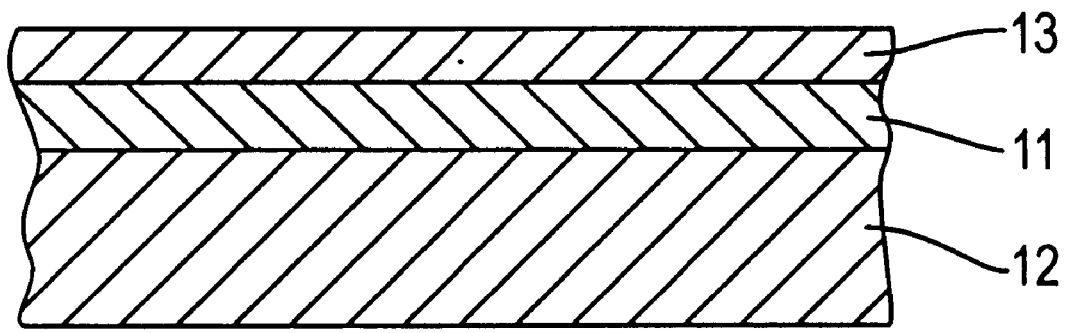
FIG. 2 is a sectional view diagrammatically illustrating the constitution of the air filter medium obtained in Comparative Example 1.

The above-obtained porous PTFE membrane and spunbonded nonwoven fabrics made of composite fibers composed of polyester/polyethylene having a core/sheath structure (trade name "Eleves," manufactured by Unichika, Ltd.) were subjected to heat lamination to prepare an air filter medium as shown in FIG. 2. The nonwoven fabrics were used in such a manner that the total weight thereof per unit area of the filter medium was the same as in Example 5. In FIG. 2, numeral 11 denotes the porous PTFE membrane, 12 denotes the spunbonded nonwoven fabrics having a basis weight of 70 g/mm$^2$, and 13 denotes the spunbonded nonwoven fabric having a basis weight of 30 g/mm$^2$.

The air filter media of Example 5 and Comparative Example 1 were tested for pressure loss, fluctuations in pressure loss, collection efficiency, fluctuations in collection efficiency, and leak-proof performance. The results obtained are shown in Table 7, in which the PF values are also shown. Each PF value was calculated from the minimum value of collection efficiency and the average value of pressure loss.

Table 7 clearly shows that the filter medium of Example 5 not only had very small fluctuations in pressure loss and collection efficiency, but also showed high leak-proof performance with completely no leakage of coarse particles. In contrast, the filter medium of Comparative Example 1 partly showed leakage.

As described above, a porous PTFE membrane having a high collection efficiency and a low pressure loss can be produced with good reproducibility by mixing a fine PTFE powder with a liquid lubricant, molding the mixture into an unsintered sheet by at least either of an extrusion method and a rolling method, stretching the sheet-form molding in the machine direction at a temperature lower than the melting point of sintered PTFE to obtain a sheet-form PTFE molding which, upon analysis with a differential scanning calorimeter, gives a crystal fusion curve having an endothermic peak in the temperature range of 345±5° C. and which has a degree of crystallization of from 0.1 to 0.85 and a specific gravity of 1.4 or lower, and then stretching the sheet-form PTFE molding in the transverse direction.

Further, fibrillation is evenly and effectively accelerated throughout the whole sheet-form PTFE molding by conducting the stretching of the unsintered sheet-form molding in the machine direction in a stretching ratio of from 10 to 60 and conducting the stretching of the sheet-form PTFE molding in the transverse direction in such a stretching ratio as to result in an area stretching ratio of 450 or higher. As a result, a porous PTFE membrane which not only has an exceedingly high PF value (22 or higher) while having high collection efficiency, but also has reduced fluctuations in pressure loss, can be produced with good reproducibility.

Furthermore, an air filter medium which has smaller fluctuations in pressure loss and collection efficiency than conventional single-layer air filter media, has no penetrating pinholes, and is free from leakage can be provided by stacking two or more layers of a porous PTFE membrane having a pressure loss lower than 20 mmH$_2$O and a PF value of 22 or higher according to the present invention.

While the invention has been described in detail and with reference to specific embodiments thereof, it will be apparent to one skilled in the art that various changes and modifications can be made therein without departing from the spirit and scope thereof.

What is claimed is:

1. A process for producing a porous polytetrafluoroethylene membrane which comprises:

mixing a fine powder of polytetrafluoroethylene with a liquid lubricant;

molding the mixture into an unsintered sheet by at least one of an extrusion method and a rolling method;

stretching the sheet-form molding in the machine direction at a temperature lower than the melting point of sintered polytetrafluoroethylene to obtain a sheet-form polytetrafluoroethylene molding which, upon analysis with a differential scanning calorimeter, gives a crystal fusion curve having an endothermic peak in the temperature range of 345±5° C. and which has a degree of crystallization of from 0.1 to 0.85 and a specific gravity of 1.4 or lower; and then stretching the sheet-form polytetrafluoroethylene molding in the transverse direction; wherein a porous polytetrafluoroethylene membrane is formed.

2. The process for producing a porous polytetrafluoroethylene membrane of claim 1, wherein the stretching of the unsintered sheet-form molding in the machine direction is conducted at a temperature of from 150 to less than 327° C. and in a stretching ratio of from 2 to 60.

3. The process for producing a porous polytetrafluoroethylene membrane of claim 1, wherein the stretching of the unsintered sheet-form molding in the machine direction is conducted in a stretching ratio of from 10 to 60, and the stretching of the sheet-form polytetrafluoroethylene molding in the transverse direction is conducted in such a stretching ratio as to provide an area stretching ratio of 450 or higher, wherein the area stretching ratio is the product of the stretching ratio in stretching in the transverse direction and the stretching ratio in stretching the unsintered sheet-form molding in the machine direction.

4. The process for producing a porous polytetrafluoroethylene membrane of claim 1, wherein the sheet-form polytetrafluoroethylene molding is heat-treated after being stretched in the transverse direction.

5. The process for producing a porous polytetrafluoroethylene membrane of claim 4, wherein the heat treatment is conducted at a temperature not lower than the melting point of sintered polytetrafluoroethylene.

6. The process for producing a porous polytetrafluoroethylene membrane of claim 1, wherein the liquid lubricant is removed from the sheet-form molding prior to the stretching of the sheet-form molding in the machine direction.

7. The process for producing a porous polytetrafluoroethylene membrane of claim if wherein the stretching of the sheet-form polytetrafluoroethylene molding in the transverse direction is conducted at a temperature of from 40 to 100° C.

* * * * *